March 27, 1962 F. H. WALLACE 3,027,126
EJECTION SEAT FOR AIRCRAFT
Filed Feb. 14, 1961 3 Sheets-Sheet 1
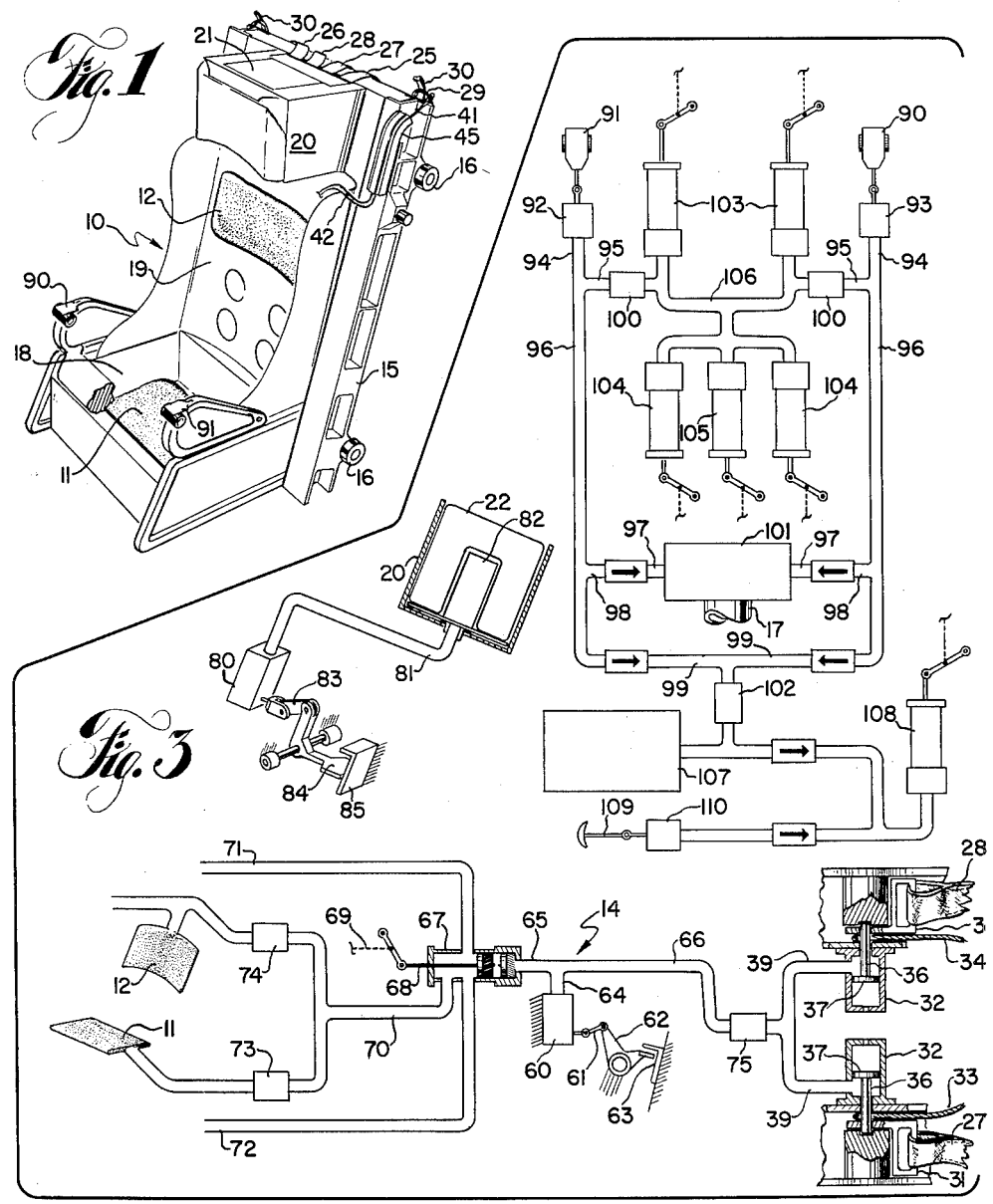
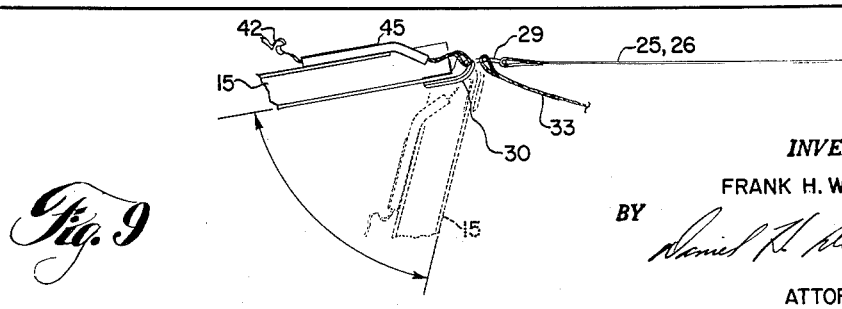
*INVENTOR.*
FRANK H. WALLACE
BY
ATTORNEY

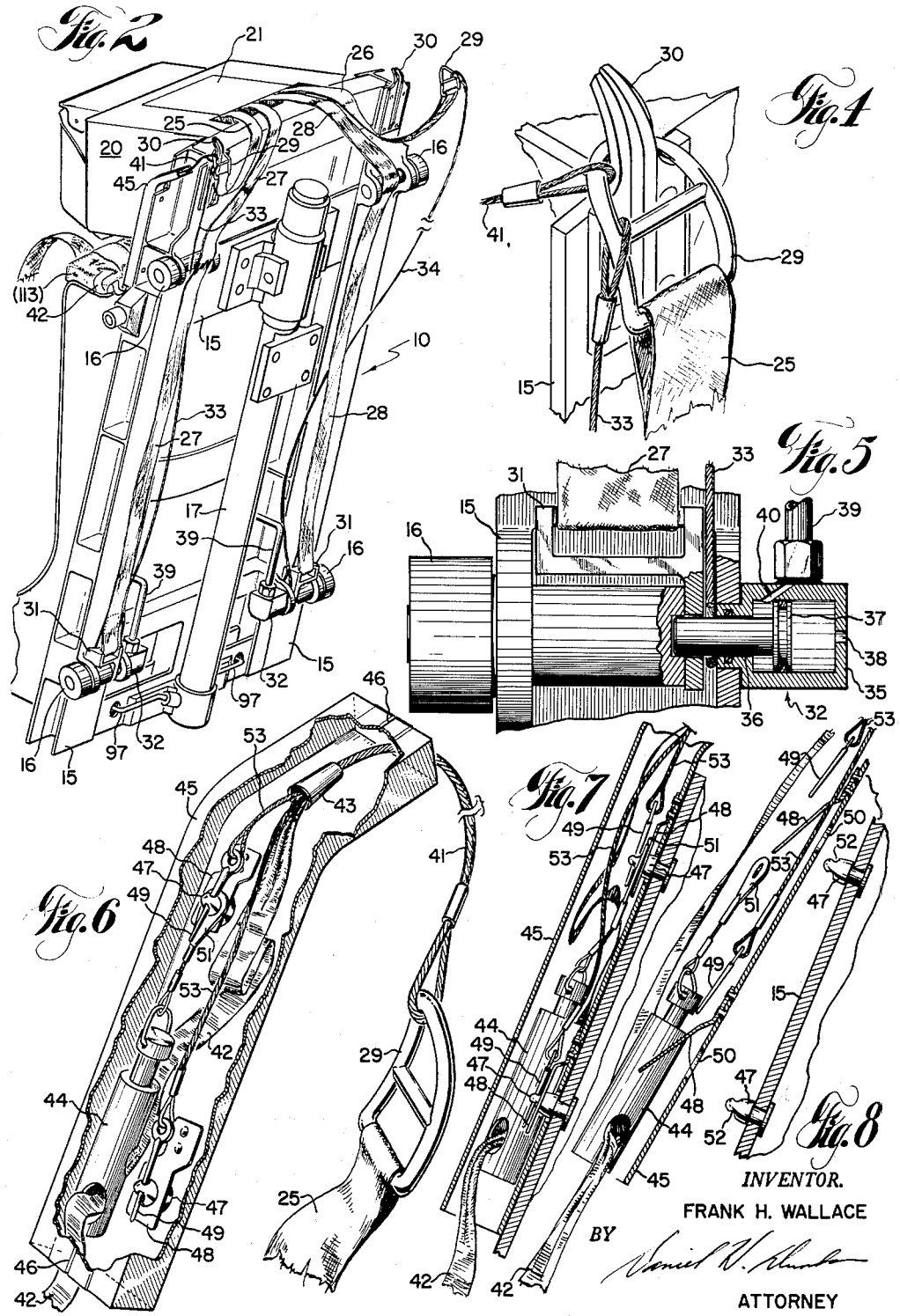

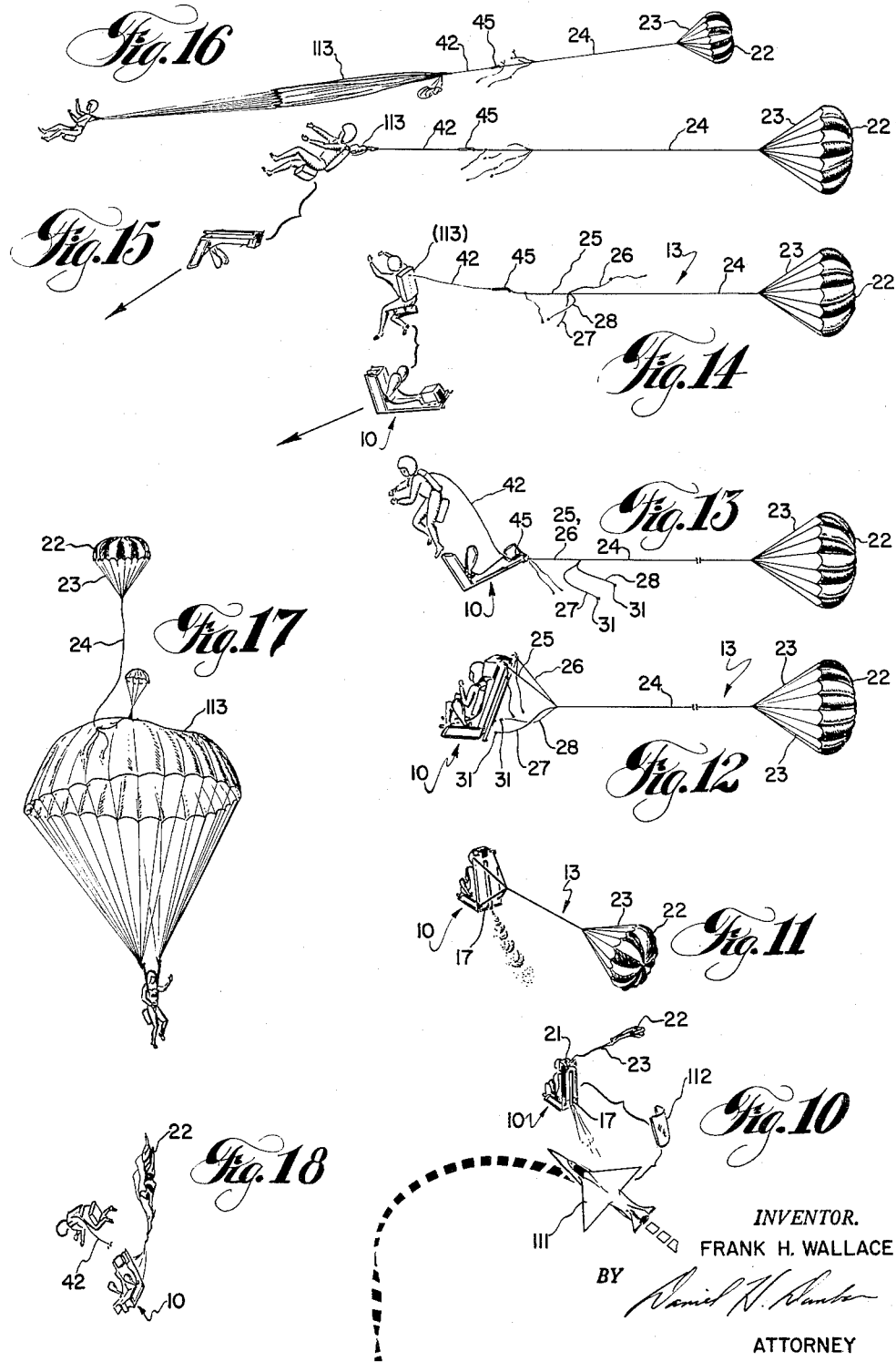

United States Patent Office 3,027,126
Patented Mar. 27, 1962

3,027,126
EJECTION SEAT FOR AIRCRAFT
Frank H. Wallace, Gahanna, Ohio, assignor to
North American Aviation, Inc.
Filed Feb. 14, 1961, Ser. No. 89,302
10 Claims. (Cl. 244—141)

This invention relates generally to aircraft and particularly concerns an improved ejection seat which may be advantageously incorporated in aircraft having a high-performance capability.

Difficulty has been experienced in properly controlling the relative positions and attitudes of an aircraft ejection seat and its occupant at least during certain phases of an emergency escape trajectory from a distressed air vehicle. Such is particularly true as to relative positions and attitudes developed immediately before, during, and immediately subsequent to the instant of occupant-seat separation. In instances in which improper relative positions and attitudes have been developed, injury to the seat occupant has resulted from subsequent occupant-seat collision, from subsequent entangling of the seat occupant's personal parachute shroud lines with the ejection seat, or from subsequent collapse of the canopy portion of the occupant's personal parachute by the ejection seat.

I have discovered that an aircraft ejection seat may be provided with suitable components to properly position the seat and the seat occupant with respect to each other throughout an occupant-seat separation operation and thereby prevent the possibility of subsequent injury to the occupant for any of the above-stated reasons. The important components to be combined with an ejection seat to obtain the advantages of my invention are separation means to forcefully eject the seat occupant from the seat, stabilizing means for initially stabilizing the seat in attitude as to pitch and yaw and for afterwards rotating the seat and occupant relative to each other in a proper manner, and control means for coordinating the functions and operation of the separation means and the stabilizing means.

It is an important object of this invention to provide an aircraft ejection seat which operates to properly position the seat occupant with respect thereto throughout all phases of an emergency escape trajectory from a distressed air vehicle.

Another object of this invention is to provide an aircraft ejection seat with components which operate to prevent collision of the seat with the seat occupant during phases of an emergency escape trajectory subsequent to occupant-seat separation.

Another object of this invention is to provide an aircraft ejection seat with components for effecting separation of the seat occupant therefrom during an escape trajectory without ensnaring the ejection seat in the shroud lines of the occupant's personal parachute or subsequently collapsing the canopy portion of that parachute.

Another object of this invention is to provide an aircraft ejection seat with equipment components which may be utilized to rotate the seat occupant and the seat to a proper attitude relative to each other for the occupant-seat separation phase of the seat's emergency escape trajectory.

A further object of this invention is to provide an aircraft ejection seat which will operate to separate its occupant therefrom at a proper time in an ejection sequence with a high degree of reliability.

Other objects and advantages of this invention will become apparent during consideration of the description and drawings.

In the drawings:

FIG. 1 is a perspective view of an aircraft ejection seat having the features of my invention;

FIG. 2 is a perspective view of a portion of the ejection seat shown in FIG. 1;

FIG. 3 is a schematic illustration of equipment components which may be utilized for effecting operation of the ejection seat shown in FIGS. 1 and 2;

FIGS. 4 and 5 illustrate details provided in the ejection seat of this invention for attaching a stabilizing parachute means thereto;

FIGS. 6 through 8 illustrate details provided in the ejection seat of this invention for connecting a stabilizing parachute means to the seat occupant's personal parachute;

FIG. 9 is an elevational view showing the position of the ejection seat of my invention relative to portions of the seat stabilizing parachute means during the occupant-seat separation phase of ejection seat emergency escape trajectory;

FIGS. 10 through 17 sequentially illustrate operation of the ejection seat of this invention in a typical emergency escape trajectory; and FIG. 18 illustrates operation of the ejection seat of my invention in an alternate emergency escape trajectory caused by an equipment malfunction.

An ejection seat 10 having the features of my invention is illustrated in FIGS. 1 and 2 of the drawings. Except for the separation means designated 11 and 12, the stabilizing means designated 13 (see FIG. 12), and the control means designated 14 (FIG. 3), ejection seat 10 is considered to be characteristic of state-of-the-art ejection seat systems. As shown in the drawings, seat 10 includes a conventional frame 15 having guide rollers 16 attached at the sides thereof and having catapult-rocket unit 17 attached at the back thereof. Separation means 11 and 12, which each have the form of a non-porous inflatable bladder, are secured to the seat pan and seat back portions 18 and 19 of ejection seat 10, respectively, in inflatable relation. Stabilizing means 13 is stored, prior to use, in the container designated 20. Container 20 has a readily removable cover member 21 and is secured to and carried by frame 15. Additionally, container 20 functions as a head rest for the occupant of ejection seat 10. The various portions of the control means 14 shown in the drawings are generally secured to portions of frame 15.

Stabilizing means 13 includes parachute canopy 22, the shroud lines 23 connected to canopy 22, line 24 connected to shroud lines 23, and strap members 25 through 28. See FIG. 12. Each of straps 25 through 28 is connected at one end to line 24. The other ends of straps 25 and 26 are connected to frame 15 by means of an attached ring element 29 which is engaged with the open hook 30 secured to frame 15. See FIG. 4. The other ends of strap members 27 and 28 are connected to frame 15 by means of a fitting 31 which is attached to the strap member and by means of a release device such as that designated 32. See FIG. 5. Straps 25 through 28 are sized in length and arranged so that the line of action of the stabilizing force developed by parachute canopy 22 and transmitted along line means 24 will pass through or adjacent the center of gravity of the occupied seat assembly when it is ejected into an airstream from a moving air vehicle and when the stabilizing means parachute is properly deployed. In order to properly retain strap members 25 and 26 in their installed position on ejection seat 10, I provide cable members 33 and 34. Each such cable member is provided with end loops; one end loop thereof engages a ring element 29 and the other end loop is operatively connected to a release device 32. Cables 33 and 34 are of a proper length whereby each ring element 29 is prevented from being disengaged relative to hook 30 until a proper time in the escape trajectory of the ejection seat.

Details of the release device designated 32 are provided in FIG. 5. The cylinder housing 35 is attached to frame 15 and contains a pin component 36 having the piston 37 secured thereto. One portion of the chamber within cylinder housing 35 is vented to the atmosphere by the vent designated 38. Another portion of the chamber within cylinder housing 35 communicates with a conduit line 39 that conducts high-pressure gas through the passageway designated 40. That portion of pin element 36 which projects from cylinder housing 35 engages an end loop of a restraining cable 33 or 34, passes through an opening provided in an end fitting 31 attached to a strap member 27 or 28, and is partially restrained at its free end by a portion of frame 15. Pin element 36 is preferably retained in its FIG. 5 position by a shear pin means (not shown). When high-pressure gas is conducted through conduit 39, passageway 40, and into the cylinder housing interior chamber, the shear pin restraint is severed and piston 37 and pin 36 are moved away from frame 15. The actuation serves to release both fitting 31 and cable 33 from restraint by frame 15. As will hereinafter be described, such actuation occurs at a proper time in the ejection seat escape trajectory through use of the control means portion of my invention.

The ejection seat illustrated in FIGS. 1 and 2 also includes components for operatively connecting stabilizing means 13 to the personal parachute (113 of FIG. 16) employed by the seat occupant. The components for effecting this connection are shown in FIGS. 6 through 8. A cable means 41 is attached to the ring element 29 of strap member 25 by a loop end and to the strap member designated 42 by the connector designated 43. Strap member 42 is severable and normally cooperates with the explosive cutter device 44 through substantial frictional restraint by components (not shown) contained therein; components 42, 43, and 44 are normally positioned within protective housing 45 during periods of non-use. Housing 45 is preferably fabricated of a flexible material and includes a longitudinal split 46 to provide access to the housing interior during installation operations. Housing 45 and the cutter 44 are mounted on and secured to frame 15 by the connector components 47 through 53 shown in FIGS. 7 and 8. Such connector components include the cone elements 47 attached to frame 15, the leaf springs 48 riveted to housing 45, and the pin elements 49. In the assembled relation, cone elements 46 project through the openings 50 in housing 45 and through similar openings contained in leaf springs 48. In addition, the cone element 47 which connects cutter device 44 to frame 15 engages the opening provided in the tab 51 that is connected by a short length of cable to the firing pin of cutter device 44. Pins 49 pass through the holes 52 provided in cone element 47 and are frictionally restrained against withdrawal by leaf springs 48. Each pin 49 is connected to cable 41 and to connector 43 by a length of cable designated 53 so that it will be disengaged from a cone element when cable 41 is moved relative to the ejection seat by virtue of forces transmitted through strap member 25.

FIG. 3 schematically illustrates the control means 14 which is employed in my invention to coordinate the sequential activation of separation means 11 and 12 and stabilizing means 13. In addition, FIG. 3 provides a schematic illustration of control components which may be employed to properly eject seat assembly 10 and its occupant from within an air vehicle. Control means 14 comprises a mechanically-fired, aneroid blocked, and delayed explosive initiator 60 which is mounted on seat frame 15 and which is mechanically-actuated by link members 61 and 62. Link 62 has the form of a bellcrank which is rotatably supported by seat frame 15 and has one arm member engaged with link 61 and another arm member for engagement with the block designated 63. Block 63 is attached to a structural component of the airplane. As ejection seat 10 is catapulted from the airplane by catapult-rocket unit 17, link 62 is rotated clockwise (FIG. 3) relative to block 63 and serves to actuate the firing pin of initiator 60. As a result, high-pressure gases are generated by initiator 60 and are ported from initiator 60 into the conduit components designated 64 through 66.

High-pressure gas received in conduit component 65 operates actuator 67 to cause its rod portion 68 to effect movement of a harness release referenced in the schematic illustration only as 69. In addition, portions of the high-pressure gas conducted to actuator 67 are further conducted into the conduit components designated 70, 71, and 72. Actuator 67 may, as in the case of other gas-fired actuator devices employed in the control means portion of seat 10, include a gas-fired explosive charge which responds to received, pressurized gas to generate additional gases and a significantly increased pressure. The high-pressure gas received in conduit component 70 is ported to gas-fired initiators 73 and 74 to effect inflation of separation means 11 and 12. Gas-fired initiators 73 and 74 also function as gas generators for boosting the pressure (and quantity) of gas to be conducted into the separation means. High-pressure gas ported into the conduit components 71 and 72 may be routed to other components associated with ejection seat 10 such as a foot retention release, face curtain release, or the like.

A portion of the high-pressure gas generated by initiator 60 is ported into conduit component 66 to the gas-fired initiator designated 75. As a result, gas of increased pressure is ported from gas-fired initiator 75 into conduit components 39 for routing to each of the release devices designated 32. Details regarding each release device 32 were described in connection with FIG. 5. Thus, at a pre-selected time after the ejection seat is catapulted from the incorporating airplane, separation means 11 and 12 and release devices 32 are made to operate nearly simultaneously. If a slight delay is required as to the operation of either components 11 and 12 or devices 32, such may be incorporated into the various gas-fired initiator devices using known explosive formulation and wave propagation techniques. It should be noted that mechanically-fired initiator 60 may be provided with an aneroid block (not shown) which responds to atmospheric pressures having a prescribed aircraft operating altitude to prevent premature firing of initiator 60 until a prescribed altitude has been reached during descent. Also, a prescribed time delay may be provided in the explosive charge portion of initiator 60. In an ejection seat having the features of my invention, a time delay of approximately 1.5 seconds has been advantageously incorporated into the equivalent of initiator 60.

A somewhat similar control means for deploying stabilizing means 13 is also illustrated in FIG. 3. As shown therein, a mechanically-fired explosive initiator 80 is carried by seat 10 and generates high-pressure gas which is ported through conduit component 81 to the actuator designated 82. Link component 84 is pivotally carried on seat frame 15 to effect the firing of mechanically-fired initiator 80 when seat assembly 10 is ejected from within the airplane. As shown in FIG. 3, one arm of bellcrank 84 is connected to link 83 and the other arm thereof is arranged to contact the block designated 85. Block 85 is attached to and carried by a structural component of the air vehicle. Actuator 82 cooperates with portions of stabilizing means 13. More particularly, when high-pressure gas is ported into actuator 82, a portion (cylinder or piston) of that actuator is rapidly moved relative to container 20 to thereby remove cover 21 and deploy the canopy 22 of the stabilizing means parachute and its attached shroud lines 23 into the surrounding airstream.

The remaining components illustrated in FIG. 3 relate to apparatus arrangements for ejecting seat 10 and its occupant from the airplane. The control components illustrated therein include manually-operated trigger devices 90 and 91 which cooperate with the mechanically-fired explosive initiators designated 92 and 93. Trigger components 90 and 91 are preferably located in the arm rests of ejection seat 10 as illustrated in FIG. 1. High-pressure gas generated by either of mechanically-fired initiators 92 or 93 is ported through conduit components 94 through 99 to the gas-fired explosive boost initiators designated 100 through 102. Initiators 100 serve to generate gas at elevated pressures for operating actuators 103 through 105. Actuators 103 may be mechanically coupled to a foot retraction device; actuators 104 are suggested to bottom the ejection seat in a proper position prior to being catapulted from the air vehicle. Actuator 105 is suggested for use to operate a conventional harness restraining mechanism. Numeral 106 references an arrangement of conduit components for porting high-pressure gas from either initiator 100 to the various actuators 103 through 105.

A portion of the high-pressure gas generated by either mechanically-fired initiator 92 or 93 is also ported to the gas-fired initiator designated 101 for firing catapult-rocket unit 17. High-pressure gas generated by gas-fired initiator 92 or 93 is also ported through conduit components to the gas-fired booster initiator designated 102. This initiator in turn may generate high-pressure gas for operating an arm retention reel 107 and the actuator designated 108. Actuator 108 is suggested for removing the canopy 112 (FIG. 10) which covers the crew compartment of the air vehicle and which is ejected prior to or during an emergency escape involving the use of ejection seat 10. Alternately, the ejection seat may be employed to unlatch and open the canopy using a camming action. A manually-operated control handle 109 and mechanically-fired initiator 110 may be provided in the control system for effecting removal of canopy 112 in an emergency situation wherein the ejection seat is not employed.

FIGS. 10 through 17 illustrate the ejection seat of my invention in certain operative positions during a typical emergency escape trajectory sequence. In FIG. 10 a disabled airplane 111 is illustrated and ejection seat 10 is shown in an operative condition shortly after its clearance from the airplane. As noted therein, the parachute canopy 22, shroud line 23, and line 24 portions of stabilizing means 13 having been partially deployed by actuator 82. FIG. 11 illustrates ejection seat 10 with stabilizing means 13 fully deployed. The resultant stabilizing force developed by parachute canopy 22 is generally normal to the seat back and is directed by line 24 toward a region near the center of gravity of the seat occupant combination. However, pitch and yawing stability is developed by attachment of line 24 to seat frame 15 through strap members 25 through 28 and connector components 29 and 32 located at the back corner extremes of system 10. FIG. 12 illustrates the condition of stabilizing means 13 immediately after occupant-seat separation has been initiated by actuation of initiator 60 (FIG. 3). As noted therein, strap members 27 and 28 only have been released from ejection seat 10; upper strap members 25 and 26 remain engaged with frame 15 through cooperation with hook elements 30. Also, the separation means 11 and 12 have been actuated to initiate the forceful ejection of the occupant of the seat. As disclosed in FIG. 13, the occupant is moved and is rotated relative to ejection seat 10 by operation of the separation means. Also, the initial release of only strap members 27 and 28 from the lower extremes of ejection seat 10 operates to transfer the stabilizing force developed in parachute canopy 22 to the upper extreme of seat assembly 10 to thereby rotate the seat relative to its FIG. 12 position. Seat 10 and the occupant are rotated and moved in different directions relative to each other in a manner whereby the occupant is positioned above the mass of the seat as shown in FIGS. 13 and 14. When seat 10 is rotated sufficiently relative to its prior stabilized position, as shown in FIG. 9 for instance, ring elements 29 on strap members 25 and 26 are disengaged from hooks 30. In practice I recommend a seat rotation of approximately 80° from stabilized attitude to complete release of stabilizing means 13. Seat 14 then falls away as by its own weight.

The objectives of my invention are also partially realized by use of stabilizing means 13 to retard the forward movement of the seat occupant and to deploy his personal parachute 113, as shown in FIGS. 14 through 16. Strap means 42 which together with the ballistic cutter 44 and housing 45 is released from attachment to frame 15 by the action of strap member 25 and cable 41 to withdraw pins 49, deploys the canopy of the occupant's personal parachute 113 as shown in FIGS. 15 and 16. A normal descent of the seat occupant is illustrated in FIG. 17.

FIG. 18 illustrates operation of a portion of the invention described herein in an emergency escape situation in which there is an equipment malfunction. Should release devices 32 fail to operate, the separation means 11 and 12 will still move the seat occupant relative to the seat a sufficient distance whereby strap 42 by its substantial normal frictional engagement with components (not shown) in device 44 moves the body of ballistic cutter device 44 away from its firing pin connection to cone element 49 and thereby fires the cutter explosive charge. This operates to sever line 42 and completely free the occupant and his parachute means 113 from connection to ejection seat 10. If desired, an automatically deployed pilot parachute may be combined with parachute 113 for use in this last type of operation.

It is to be understood that the form of the invention herewith shown and described is to be taken as a preferred embodiment of the same, but that various changes in the shape, size, number, and arrangement of parts may be resorted to without departing from the spirit of the invention or the scope of the subjoined claims.

I claim:

1. An ejection seat system for aircraft which includes: a seat means, separation means carried by said seat means for ejecting the system occupant therefrom, seat stabilizing means connected to said seat means to establish a stabilizing force and to subsequently establish an attitude-changing force which rotates said seat to a non-collision attitude with respect to the seat occupant, and control means operably connecting said separation means to said stabilizing means, said seat stabilizing means comprising parachute means which develops said stabilizing force and said attitude-changing force, first strap means fixedly connected relative to said parachute means and releasably connected to the upper portion of said seat means, and second strap means fixedly connected relative to said parachute means and releasably connected to the lower portion of said seat means, said stabilizing force being directed to said seat means only when said first and second strap means are each connected to said seat means, and said attitude-changing force being directed to said seat means when said first strap means only is connected to said seat means as a consequence of operating said control means and said separation means.

2. The system defined in claim 1, wherein hook means are provided for connecting said first strap means to said seat means, and wherein selectively operable release means are provided for connecting said second strap means to said seat means, said control means actuating said release means to establish and direct said attitude-changing force to said seat means when actuating said separation means.

3. The ejection seat system defined in claim 2, wherein said separation means and said release means are each actuated by high-pressure gas, and wherein said control means includes an initiator means which generates high-pressure gas, said release means and said separation means being operatively connected to and actuated by said initiator means.

4. An ejection seat system which includes: a seat for the occupant of the system, separation means actuated to forcefully eject the system occupant from said seat, stabilization means actuated to stabilize said seat as to attitude during portions of an escape trajectory and to subsequently move said seat to a different attitude, and control means operatively connected to said separation means and to said stabilization means, said control means actuating said separation means to forcefully eject the system occupant from said seat and simultaneously actuating said stabilization means to move said seat from a stabilized attitude to a non-collision attitude relative to the system occupant.

5. The ejection seat system defined in claim 4, wherein said seat includes a seat pan portion and a seat back portion, and wherein said separation means includes simultaneously actuated portions, said separation means portions being located in each said seat pan portion and said seat back portion.

6. The ejection seat system defined in claim 4, wherein said stabilization means is attached to said seat adjacent a seat upper extreme and adjacent a seat lower extreme, and wherein said control means is operatively connected to said stabilization means only at said seat lower extreme attachment, said control means releasing said stabilizer means from said seat lower extreme attachment only when actuating said separation means.

7. An ejection seat system which includes: a seat for the system occupant and having four corner regions at the back thereof, separation means carried by said seat and actuated to forcefully separate the system occupant from said seat, stabilization means attached to said seat at each of said four back corner regions and actuated to stabilize said seat in pitch and in yaw during portions of an escape trajectory and to move said seat from a stabilized attitude to a non-collision attitude, and control means connected to said separation means and to said stabilization means to control sequential operation thereof, said control means having a first portion which deploys said stabilization means to stabilize said seat in pitch and in yaw and having a second portion which releases said stabilization means from attachment to said seat at the two lowermost of said seat back four corner regions and which simultaneously actuates said separation means to move said seat to a non-collision attitude and to a non-collision position relative to the system occupant.

8. The ejection seat system defined in claim 7, wherein open hook-like means are attached to said seat back at each of the two uppermost corner regions thereof, and wherein release means are attached to said seat back at each of the two lowermost corner regions thereof, said hook-like means having said stabilization means releasably engaged therewith and being configured to release said stabilization means from engagement therewith when said stabilization means is fully deployed and when said stabilization means moves said seat from a stabilized attitude to a non-collision attitude relative to the seat occupant.

9. The ejection seat system defined in claim 7, wherein said stabilization means includes: a parachute component having a canopy portion and shroud lines attached thereto, line means connected to said parachute shroud lines, and strap means connected to said line means and to said seat back four corner regions, said strap means being of a length and arrangement whereby the direction of said line means is generally normal to said seat back when said parachute component is fully deployed.

10. The ejection seat system defined in claim 9, wherein said strap means is comprised of four strap members, said strap members being of near-equal length.

References Cited in the file of this patent

UNITED STATES PATENTS

| | | |
|---|---|---|
| 2,610,815 | Smith | Sept. 16, 1952 |
| 2,671,622 | Soulnier | Mar. 9, 1954 |
| 2,708,083 | Martin | May 10, 1955 |
| 2,892,602 | Servanty | June 30, 1959 |
| 2,931,598 | Sanctuary | Apr. 5, 1960 |
| 2,940,701 | Beem et al. | June 14, 1960 |